United States Patent
Zhan et al.

(10) Patent No.: US 12,319,499 B2
(45) Date of Patent: Jun. 3, 2025

(54) GOODS TAKING MECHANISM AND CARRYING DEVICE

(71) Applicant: HAI ROBOTICS CO., LTD., Guangdong (CN)

(72) Inventors: Qingxin Zhan, Guangdong (CN); Zhe Kong, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 303 days.

(21) Appl. No.: 18/156,696

(22) Filed: Jan. 19, 2023

(65) Prior Publication Data

US 2023/0150765 A1    May 18, 2023

Related U.S. Application Data

(63) Continuation of application No. PCT/CN2021/107893, filed on Jul. 22, 2021.

(30) Foreign Application Priority Data

Jul. 30, 2020  (CN) .......................... 202021550076.9

(51) Int. Cl.
*B65G 1/04*     (2006.01)
*B66F 9/18*     (2006.01)

(52) U.S. Cl.
CPC ............... *B65G 1/04* (2013.01); *B66F 9/183* (2013.01)

(58) Field of Classification Search
CPC .............................. B66F 9/183; B65G 1/0435
See application file for complete search history.

(56) References Cited

U.S. PATENT DOCUMENTS

| | | | | |
|---|---|---|---|---|
| 4,279,564 | A * | 7/1981 | Weinert | B66F 9/183 |
| | | | | 414/667 |
| 10,322,505 | B2 * | 6/2019 | Hellenbrand | B65G 1/0435 |
| 10,618,732 | B2 * | 4/2020 | Iwata | B65G 41/003 |

(Continued)

FOREIGN PATENT DOCUMENTS

| | | |
|---|---|---|
| CN | 105858192 A | 8/2016 |
| CN | 107986001 A | 5/2018 |
| CN | 108582123 A | 9/2018 |

(Continued)

OTHER PUBLICATIONS

Machine Translation of CN208453712 from espacenet. (Year: 2018).*

(Continued)

*Primary Examiner* — Mark C Hageman
(74) *Attorney, Agent, or Firm* — Frank Gao, Esq.

(57) ABSTRACT

The present disclosure provides a goods taking mechanism and a carrying device. The goods taking mechanism includes a fixed member, a first clamping plate, a second clamping plate, and a driving assembly, where the first clamping plate and the second clamping plate are oppositely mounted on the fixed member and are connected to the driving assembly, and the first clamping plate and the second clamping plate are movable relative to the fixed member under the action of the driving assembly, to act on two opposing sides of a to-be-moved object. The goods taking mechanism of the present disclosure can clamp to-be-moved objects of different sizes, which helps reduce the distance between the adjacent to-be-moved objects.

14 Claims, 9 Drawing Sheets

(56) References Cited

U.S. PATENT DOCUMENTS 11,708,218 B2 * 7/2023 Kapust ................ B65G 1/1373
700/218

FOREIGN PATENT DOCUMENTS

| CN | 108584269 A | 9/2018 |
| CN | 207973218 U | 10/2018 |
| CN | 208453712 U | 2/2019 |
| CN | 209480701 U | 10/2019 |
| CN | 110668160 A | 1/2020 |
| CN | 212711034 U | 3/2021 |
| CN | 213567905 U | 5/2021 |
| CN | 213415500 U | 6/2021 |
| EP | 2380828 A1 | 10/2011 |
| JP | 2011079657 A | 4/2011 |

OTHER PUBLICATIONS

International Search Report for PCT/CN2021/107893.
Cited in the search/examination report of EP21850197.1; dated Oct. 10, 2023.

* cited by examiner

GOODS TAKING MECHANISM AND CARRYING DEVICE

CROSS-REFERENCE TO RELATED APPLICATIONS

This application is a continuation of International Patent Application No. PCT/CN2021/107893 filed on Jul. 22, 2021, which claims priority to Chinese Patent Application No. 202021550076.9, filed on Jul. 30, 2020, which are incorporated herein by reference in their entireties.

TECHNICAL FIELD

The present disclosure relates to the field of smart warehousing technologies, and in particular, to a goods taking mechanism and a carrying device.

BACKGROUND

With the continuous development of science and technology, as industrial carrying devices that can perform automatic carrying works, the carrying devices are widely applied to the fields such as a smart warehousing system, a smart logistics system, and a smart sorting system.

The carrying work performed by the carrying device is that a workpiece is hold by one device and is moved from one processing position to another processing position. Different tail executors may be mounted on the carrying device to complete carrying works of workpieces of different shapes and states, and the carrying device can replace manpower to carry goods and plays an important role in the many fields. Currently, in the smart warehousing system, there is a distance between adjacent goods boxes, when the carrying device carries goods, clamping arms of a goods taking mechanism of the carrying device extend into the distance and are clamped on the two opposing sides of the goods to take and store the goods.

However, the goods taking mechanism of the existing carrying device can clamp only the goods boxes of the fixed sizes, which not only has a relatively small application scope but also causes the distance between the adjacent goods boxes to be relatively large.

SUMMARY

The present disclosure provides a goods taking mechanism and a carrying device, which clamp to-be-moved objects of different sizes, and helps reduce a distance between adjacent to-be-moved objects.

According to a first aspect, the present disclosure provides a goods taking mechanism, including a fixed member, a first clamping plate, a second clamping plate, and a driving assembly, where the first clamping plate and the second clamping plate are oppositely mounted on the fixed member and are connected to the driving assembly, and the first clamping plate and the second clamping plate are movable relative to the fixed member under the action of the driving assembly, to act on two opposing sides of a to-be-moved object.

According to the goods taking mechanism described above, optionally, the first clamping plate and the second clamping plate are movable towards reverse directions relative to the fixed member.

According to the goods taking mechanism described above, optionally, the first clamping plate and the second clamping plate are movable horizontally relative to the fixed member.

According to the goods taking mechanism described above, optionally, the first clamping plate and the second clamping plate are clamped on the two opposing sides of the to-be-moved object; or
the first clamping plate and the second clamping plate are engaged with the to-be-moved object.

According to the goods taking mechanism described above, optionally, both the first clamping plate and the second clamping plate are slidably connected to the fixed member.

According to the goods taking mechanism described above, optionally, the first clamping plate includes a clamping portion and an assembly portion, the clamping portion is mounted on the fixed member through the assembly portion and acts on a side wall of the to-be-moved object, and a structure of the second clamping plate is the same as a structure of the first clamping plate.

According to the goods taking mechanism described above, optionally, the clamping portion is perpendicular to the assembly portion.

According to the goods taking mechanism described above, optionally, the goods taking mechanism further includes a first connection member, where both the assembly portions of the first clamping plate and the second clamping plate are hinged to the first connecting member, hinge portions are provided between the assembly portions and the first connecting member, and the first clamping plate and the second clamping plate are rotatable around the hinge portions towards the to-be-moved object, to be clamped on the two opposing sides of the to-be-moved object.

According to the goods taking mechanism described above, optionally, the assembly portions are slidably connected to the fixed member by the first connection member.

According to the goods taking mechanism described above, optionally, the goods taking mechanism further includes a limiting assembly, and the limiting assembly is configured to limit movement of the first clamping plate and the second clamping plate.

According to the goods taking mechanism described above, optionally, the limiting assembly includes a second connection member, a third connection member, and a sliding member fixed on the fixed member; the second connection member is provided with a first sliding groove and is connected to the first clamping plate; and the third connection member is provided with a second sliding groove and is connected to the second clamping plate, and the sliding member passes through the first sliding groove and the second sliding groove.

According to the goods taking mechanism described above, optionally, the limiting assembly further includes a fixed frame mounted on the fixed member, the fixed frame is provided with two third sliding grooves that are mounted opposite to each other, a part of the second connection member and a part of the third connection member are mounted in the fixed frame through penetration, and the sliding member passes through the first sliding groove, the second sliding groove, and the third sliding grooves and is fixed in the fixed frame.

According to the goods taking mechanism described above, optionally, the limiting assembly further includes a limiting shaft, and the sliding member is fixed in the fixed frame through the limiting shaft.

According to the goods taking mechanism described above, optionally, the first sliding groove and the second sliding groove are parallel and overlap each other, and the third sliding grooves are perpendicular to the first sliding groove and the second sliding groove.

According to the goods taking mechanism described above, optionally, the second connection member is connected to the first clamping plate by the first connection member, and the third connection member is connected to the second clamping plate by the first connection member.

According to the goods taking mechanism described above, optionally, the first clamping plate further includes an engagement portion, and the engagement portion is mounted on one end of the clamping portion away from the assembly portion and faces a surface of the to-be-moved object, to be engaged with the side wall of the to-be-moved object.

According to the goods taking mechanism described above, optionally, a recess portion matching the engagement portion is respectively mounted on the two opposing sides of the to-be-moved object.

According to the goods taking mechanism described above, optionally, the engagement portion is a hook, and the recess portion is a slot.

According to the goods taking mechanism described above, optionally, the goods taking mechanism further includes a sliding assembly, where both the first clamping plate and the second clamping plate are slidably connected to the fixed member by the sliding assembly.

According to the goods taking mechanism described above, optionally, the sliding assembly includes a slide rail and a sliding block matching the slide rail, one of the slide rail and the sliding block is located on the fixed member, and the other of the slide rail and the sliding block is located on surfaces of the first clamping plate and the second clamping plate facing the fixed member.

According to the goods taking mechanism described above, optionally, the driving assembly includes a driving motor and a transmission set, the driving motor is separately connected to the first clamping plate and the second clamping plate by the transmission set, and the transmission set is configured to cause the first clamping plate and the second clamping plate to be movable relative to the fixed member under the driving of the driving motor.

According to the goods taking mechanism described above, optionally, the transmission set includes a gear and two racks, and the gear is connected to an output shaft of the driving motor; the two racks are respectively connected to the first clamping plate and the second clamping plate and mesh with two opposing sides of the gear; and under the rotation of the gear, the two racks can drive the first clamping plate and the second clamping plate to move close to or away from each other on the fixed member.

According to the goods taking mechanism described above, optionally, the transmission set further includes a reducer, one end of the reducer is connected to the output shaft of the driving motor, and an other end of the reducer is connected to the gear.

According to the goods taking mechanism described above, optionally, the transmission set further includes a fourth connection member, both the first clamping plate and the second clamping plate are connected to the racks by the fourth connection member, and the transmission set is located on one side of the fixed member opposite to the first clamping plate and the second clamping plate.

According to the goods taking mechanism described above, optionally, the transmission set includes a transmission member and two opposing connection arms, and the transmission member is connected to the output shaft of the driving motor and is rotatable around the output shaft; the two connection arms are located on two opposing sides of the transmission member, to respectively correspond to the first clamping plate and the second clamping plate; and a first end of each of the connection arms is connected to the transmission member, there is a distance between a connection point of the connection arm on the transmission member and the output shaft, and a second end of each of the connection arms is connected to the first clamping plate or the second clamping plate.

According to the goods taking mechanism described above, optionally, the connection arm is an arc-shaped arm.

According to a second aspect, the present disclosure provides a carrying device, including a body and the goods taking mechanism according to any one of the foregoing descriptions mounted on the body.

According to the goods taking mechanism and the carrying device provided in the present disclosure, under the action of the driving assembly, the first clamping plate and the second clamping plate are movable relative to the fixed member, to adjust the distance between the first clamping plate and the second clamping plate, so that the first clamping plate and the second clamping plate act on two opposing sides of the to-be-moved object. In this way, on one hand, to-be-moved objects of more sizes can be met, and the application scope of the goods taking mechanism is wider, and on the other hand, it can help reduce the distance between adjacent to-be-moved objects. In addition, the first clamping plate and the second clamping plate are plate structures and have smaller thicknesses than clamping arms of an existing goods taking mechanism, so that the to-be-moved object is moved and the distance between the adjacent to-be-moved objects can further be reduced. Therefore, the goods taking mechanism and the carrying device provided in the present disclosure can clamp the to-be-moved objects of different sizes, which helps reduce the distance between the adjacent to-be-moved objects.

BRIEF DESCRIPTION OF THE DRAWINGS

To describe the technical solutions in the embodiments of the present application or in the prior art more clearly, the following briefly introduces the accompanying drawings required for describing the embodiments or the prior art. Apparently, the accompanying drawings in the following description show some embodiments of the present application, and a person of ordinary skill in the art may still derive other drawings from these accompanying drawings without creative efforts.

DESCRIPTION OF REFERENCE NUMERALS

Figure 1:
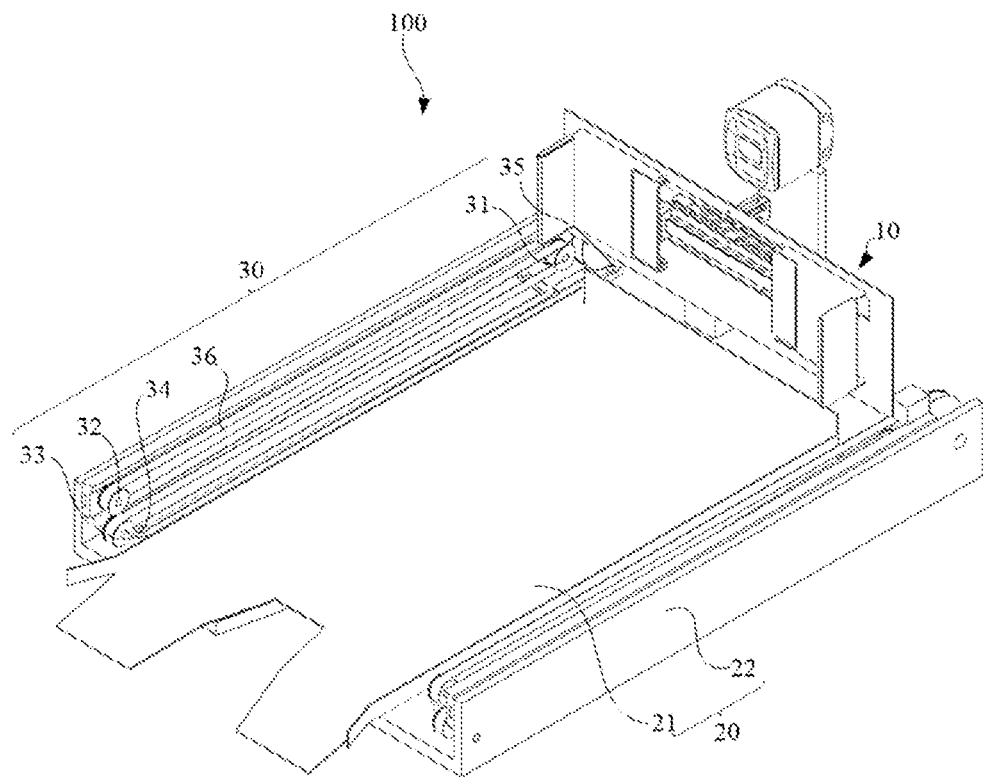
FIG. 1 is a schematic structural diagram of a carrying device according to an embodiment of the present disclosure.

100—carrying device; 10—goods taking mechanism; 11—fixed member; 111—through hole; 12—first clamping plate; 121—clamping portion; 122—assembly portion; 123—engagement portion; 13—second clamping plate;

14—driving assembly; 141—driving motor; 142—transmission set; 143—gear; 144—rack; 145—reducer; 146—transmission member; 147—connection arm; 148—fourth connection member; 149—fixed strip; 15—sliding assembly; 151—slide rail; 152—sliding block;

16—limiting assembly; 161—second connection member; 162—third connection member; 163—sliding member; 164—fixed frame 1; 165—limiting shaft; 167—first sliding groove; 168—second sliding groove; 169—third sliding groove; 17—first connection member; 18—hinge portion; 19—support;

20—fork assembly; 21—tray; 22—fixed base; 221—track;

30—transmission assembly; 31—first movable wheel; 32—second movable wheel; 33—third movable wheel; 34—first fixed wheel; 35—second fixed wheel; 36—conveyor belt;

200—to-be-moved object; and 210—recess portion.

DETAILED DESCRIPTION

In order to make the objectives, technical solutions, and advantages of the embodiments of the present invention clearer, the technical solutions in the embodiments of the present invention will be clearly and completely described with reference to the accompanying drawings in the embodiments of the present invention. Obviously, it is a part of the embodiments of the present invention, but not all the embodiments. All other embodiments obtained by a person of ordinary skill in the art based on the embodiments of the present disclosure without creative efforts shall fall within the protection scope of the present disclosure.

Currently, application scenarios of carrying devices may include, but not limited to, a smart warehousing system, a smart logistics system, a smart sorting system, or other application scenarios that require the carrying devices. The smart warehousing system is used as an example. A distance is reserved between two adjacent goods boxes, so that the carrying device takes and stores the goods boxes. The carrying device mainly includes a goods taking mechanism. In this way, when the carrying device carries the goods box, clamping arms of the goods taking mechanism may extend into the distance and are clamped on two opposing sides of the goods box, to take or store the goods box.

However, the distance between the two clamping arms of the existing goods taking mechanism is a fixed value and cannot be adjusted, thus the two clamping arms can clamp only goods boxes of fixed sizes. In addition, the clamping arms are relatively thick, thus when the clamping arms are clamped on the two sides of the goods box, the distance between the adjacent goods boxes becomes relatively large. For goods boxes of relatively small sizes, because the distance between the two clamping arms of the existing goods taking mechanism is fixed, even if the goods taking mechanism can take the goods boxes of the small sizes, the distance between the goods boxes of the small sizes is larger than the distance between goods boxes of normal sizes (most sizes of the goods boxes in the smart warehousing system or in other fields). Therefore, the goods taking mechanism of the existing carrying device not only has a relatively small application scope, but also causes the distance between the adjacent goods boxes to be larger.

Therefore, the embodiments of the present disclosure provide a goods taking mechanism and a carrying device, which clamp goods boxes of different sizes, and helps reduce the distance between adjacent goods boxes.

The following further describes the goods taking mechanism and the carrying device in this embodiment by using the application scenario of the smart warehousing system as an example.

Figure 2:
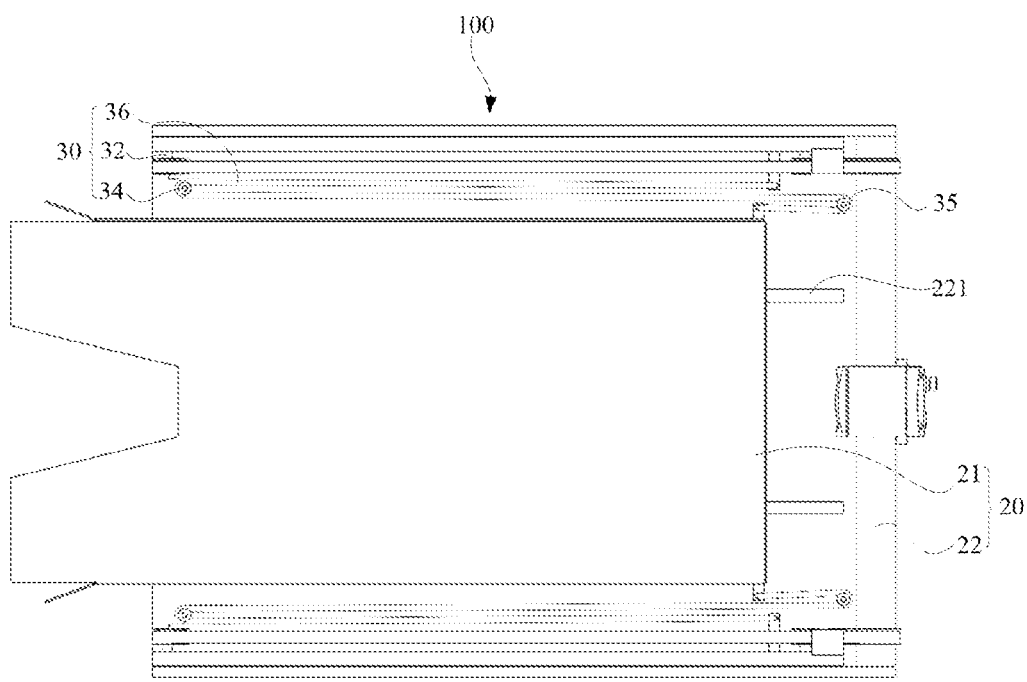
FIG. 2 is a schematic diagram of a moving state of a carrying device according to an embodiment of the present disclosure.

FIG. 1 is a schematic structural diagram of a carrying device according to an embodiment of the present disclosure. FIG. 2 is a schematic diagram of a moving state of a carrying device according to an embodiment of the present disclosure.

As shown in FIG. 1 and FIG. 2, this embodiment of the present disclosure provides an entire structure of a carrying device 100. It can be learned from FIG. 1 and FIG. 2 that the carrying device 100 may include a body and a goods taking mechanism 10 mounted on the body. The body may be understood as a structure except for the goods taking mechanism 10 on the carrying device 100. As shown in FIG. 1 and FIG. 2, the body may include a base assembly 20, and the base assembly 20 may include a tray 21, a fixed base 22, and two transmission assemblies 30. The tray 21 is mounted on the fixed base 22 and is slidably connected to the fixed base 22. The transmission assemblies 30 may be mounted on the fixed base 22, located on two opposing sides of the tray 21, and connected to the tray 21, so that the tray 21 may perform a reciprocating movement towards or away from a to-be-moved object 200, to move the to-be-moved object 200. The goods taking mechanism 10 may be located on one end of the base assembly 20, is clamped on two opposing sides of the to-be-moved object 200 such as a goods box, and is configured to move the to-be-moved object 200 to the tray 21 and then place the to-be-moved object 200 at a specified position (that is, a specified height) of a shelving unit in a smart warehousing system or carry the to-be-moved object 200 from a shelving unit to a specified placement platform, to take or store the to-be-moved object 200.

The tray 21 may be slidably connected to rails 221 on the fixed base 22 by sliding blocks (not shown in the figure) at the bottom. In this way, when the goods taking mechanism 10 moves the to-be-moved object 200, the tray 21 may slide relative to the fixed base 22, to extend out of the fixed base 22 and in contact with the bottom of the to-be-moved object 200, so that the goods taking mechanism 10 moves the to-be-moved object 200 to the tray 21, or moves the to-be-moved object 200 on the tray 21 to the placement platform and can also prevent the to-be-moved object 200 from falling during taking and storing.

Alternatively, in a possible implementation, when the to-be-moved object 200 is located close to the inside of the shelving unit (that is, the to-be-moved object 200 is closer to the middle of the shelving unit than the edge of the shelving unit), the tray 21 may move to close to or in contact with the edge of the shelving unit, and the goods taking mechanism 10 continues to extend towards the to-be-moved object 200 relative to the shelving unit, to move the to-be-moved object 200. In this way, when the to-be-moved object 200 is moved, the to-be-moved object 200 can also be prevented from falling during taking or storing.

Each of the transmission assemblies 30 may include a motor (not shown in the figure), a movable wheel set, a fixed wheel set, and a conveyor belt 36. The movable wheel set is connected to an output shaft of the motor, one end of the conveyor belt 36 is fixedly connected to the movable wheel set, and the other end of the conveyor belt 36 is wound around the fixed wheel set and is fixedly connected to the tray 21. In this way, when the motor rotates, the fixed wheel set starts rotating, and under the driving of the conveyor belt 36, a direction of the conveyor belt 36 is changed through the fixed wheel set, and then the tray 21 is driven by the conveyor belt 36 to move relative to the fixed base 22, thereby providing power for the movement of the tray 21 relative to the fixed base 22.

For example, the movable wheel set may include a first movable wheel 31, a second movable wheel 32, and a third movable wheel 33. The first movable wheel 31, the second movable wheel 32, and the third movable wheel 33 are arranged on the side wall of the fixed base 22 in a triangle shown in FIG. 1, and the first movable wheel 31 is connected to the output shaft of the motor. The fixed wheel set may include a first fixed wheel 34 and a second fixed wheel 35. Both the first fixed wheel 34 and the second fixed wheel 35 are located on the bottom wall of the fixed base 22; and the second fixed wheel 35 is close to one end of the tray 21 facing the goods taking mechanism 10 (that is, the tail end of the tray 21), and the first fixed wheel 34 is close to one end of the tray 21 away from the goods taking mechanism 10 (that is, the front end of the tray 21). The conveyor belt 36 is fixed on the first movable wheel 31, and is wound on the second movable wheel 32, the third movable wheel 33, the first fixed wheel 34, and the second fixed wheel 35 in sequence and then fixed on the tail end of the tray 21. In this way, the movable wheel set may be driven by the motor, and further a conveying direction of the conveyor belt 36 is driven, to provide power for the movement of the tray 21 relative to the fixed base 22 or drive the tray 21 to reset. Specifically, the transmission assembly 30 may refer to a transmission assembly 30 of a carrying device 100 in the prior art. In this embodiment, the transmission assembly 30 is not further described.

When the conveyor belt 36 is an elastic body, for example, an elastic conveyor belt, the elastic conveyor belt may further drive the tray 21 that moves relative to the fixed base 22 to reset.

It may be understood that the schematic structure in this embodiment constitutes no specific limitation on the structure of the carrying device 100. In some other embodiments of the present disclosure, the carrying device 100 may include more or fewer components than those shown in the figure, or some components may be combined, or some components may be split, or components are arranged in different manners.

The following further describes the goods taking mechanism 10 of the carrying device 100 in this embodiment.

Embodiment 1

Figure 3:
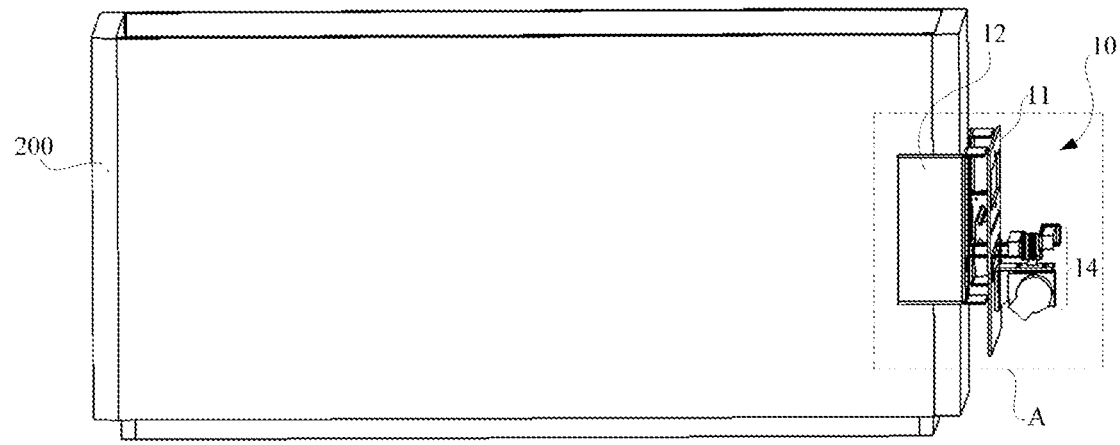
FIG. 3 is a schematic diagram of assembly of a goods taking mechanism and a to-be-moved object according to Embodiment 1 of the present disclosure.
Figure 4:
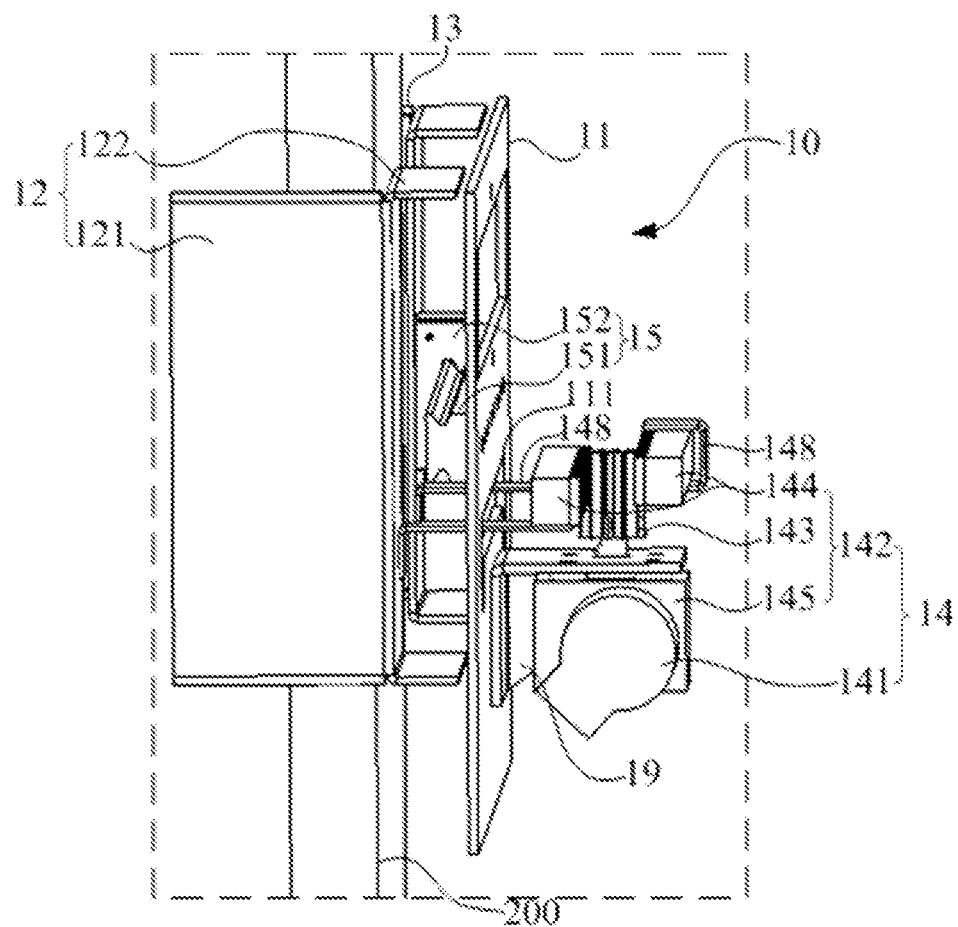
FIG. 4 is a schematic enlarged view of a part A in FIG. 3 according to an embodiment of the present disclosure.
Figure 5:
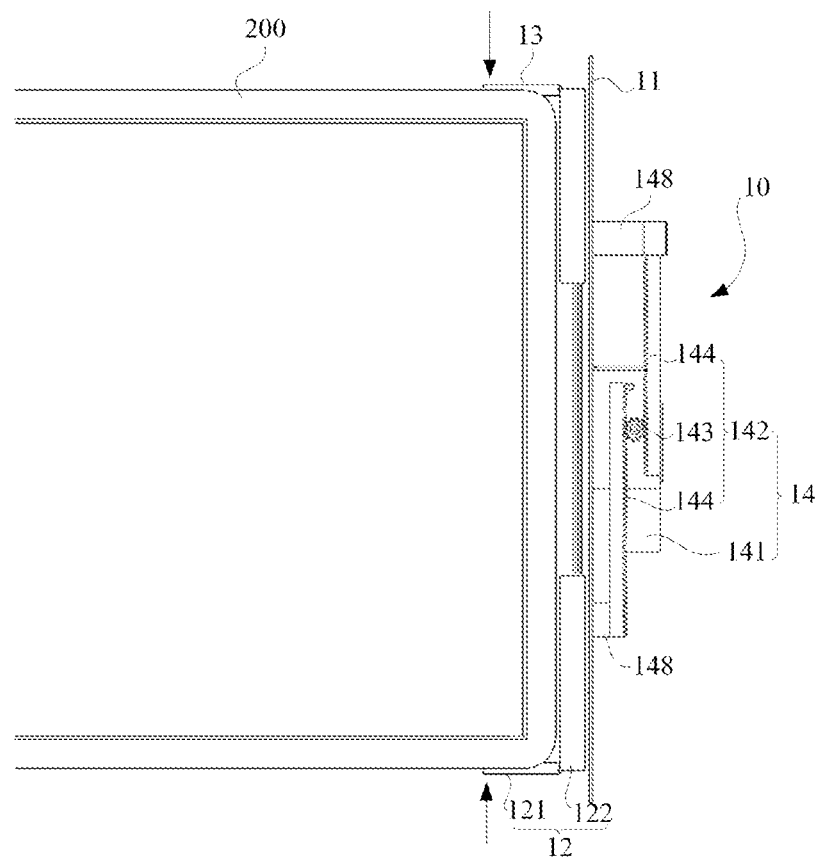
FIG. 5 is a top view of local assembly of a goods taking mechanism and a to-be-moved object according to Embodiment 1 of the present disclosure.
Figure 6:
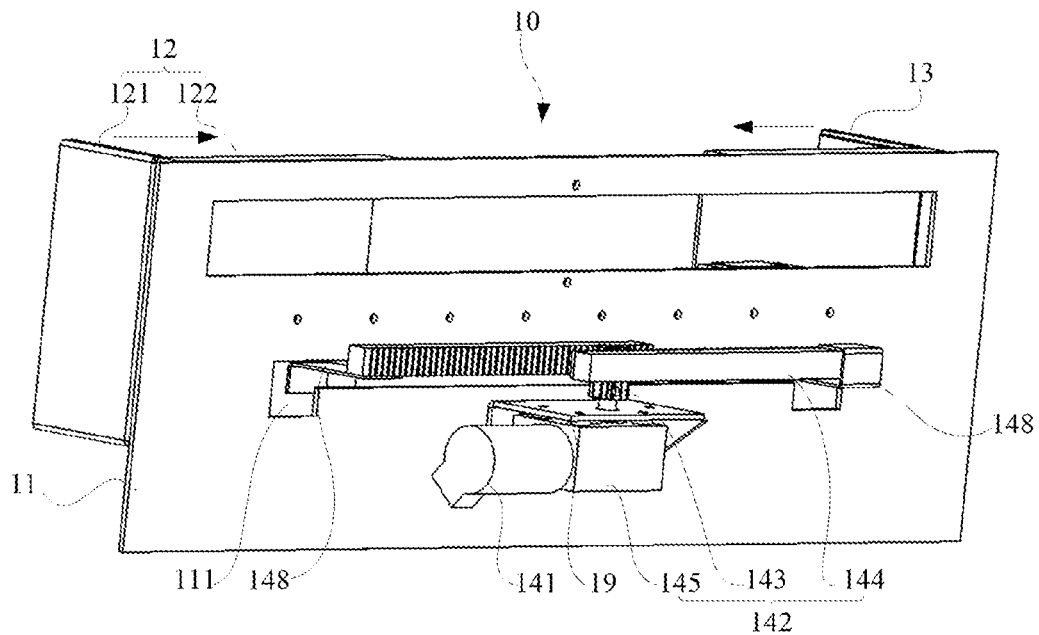
FIG. 6 is a schematic structural diagram of a goods taking mechanism according to Embodiment 1 of the present disclosure.
Figure 7:
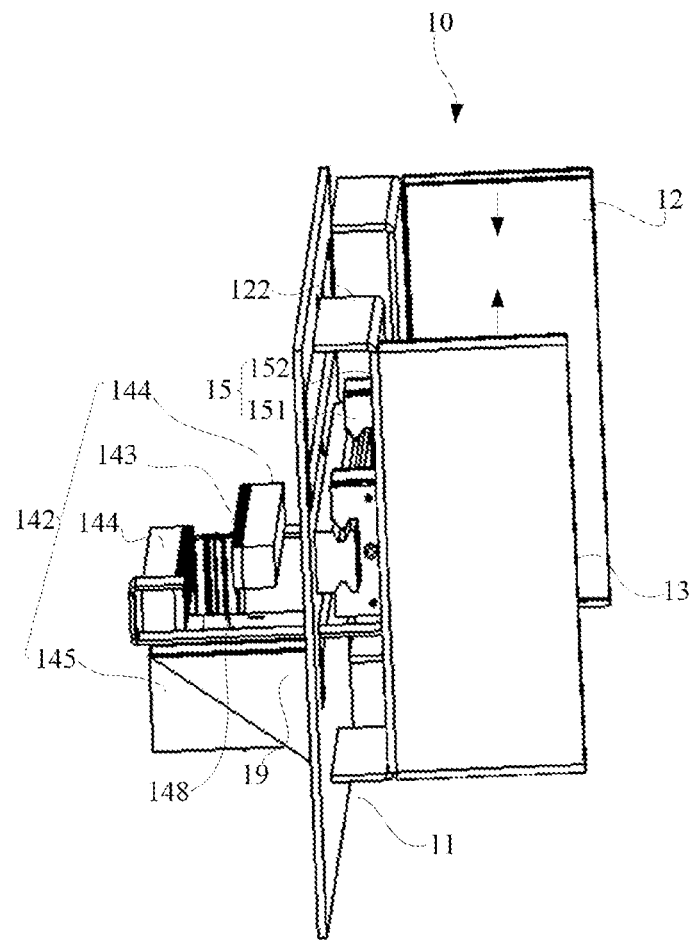
FIG. 7 is a schematic structural diagram of a goods taking mechanism from another angle according to Embodiment 1 of the present disclosure.

FIG. 3 is a schematic diagram of assembly of a goods taking mechanism and a to-be-moved object according to Embodiment 1 of the present disclosure. FIG. 4 is a schematic enlarged view of a part A in FIG. 3 according to an embodiment of the present disclosure. FIG. 5 is a top view of local assembly of a goods taking mechanism and a to-be-moved object according to Embodiment 1 of the present disclosure. FIG. 6 is a schematic structural diagram of a goods taking mechanism according to Embodiment 1 of the present disclosure. FIG. 7 is a schematic structural diagram of a goods taking mechanism from another angle according to Embodiment 1 of the present disclosure.

As shown in FIG. 3 to FIG. 7, this embodiment provides the entire structure of the goods taking mechanism 10. The goods taking mechanism 10 may include a fixed member 11, a first clamping plate 12, a second clamping plate 13, and a driving assembly 14. The first clamping plate 12 and the second clamping plate 13 are mounted opposite to each other on the fixed member 11, so that the first clamping plate 12 and the third clamping plate 13 may be bilaterally and symmetrically mounted on the fixed member 11, to act on the two opposing sides of the to-be-moved object 200, so as to take or store the to-be-moved object 200.

Referring to FIG. 3 to FIG. 7, the first clamping plate 12 and the second clamping plate 13 may be connected to the driving assembly 14, and the first clamping plate 12 and the second clamping plate 13 may move relative to the fixed member 11 under the action of the driving assembly 14, to act on the two opposing sides of the to-be-moved object 200. In this way, when the goods taking mechanism 10 needs to adapt to to-be-moved objects 200 of different sizes such as goods boxes, the first clamping plate 12 and the second clamping plate 13 may move relative to the fixed member 11 under the driving of the driving assembly 14, to act on the two opposing sides of the to-be-moved object 200, so as to move the to-be-moved object 200.

It should be understood that the movements of the first clamping plate 12 and the second clamping plate 13 relative to the fixed member 11 may be understood as that the first clamping plate 12 and the second clamping plate 13 move close to (directions indicated by arrows in FIG. 5 to FIG. 7) or away from each other on the fixed member 11, so that the distance between the first clamping plate 12 and the second clamping plate 13 can be changed, to meet the to-be-moved objects 200 of more sizes and extend the application scope of the goods taking mechanism 10.

Because the first clamping plate 12 and the second clamping plate 13 may move relative to the fixed member 11, the distance between the first clamping plate 12 and the second clamping plate 13 may be adjusted according to the size of the to-be-moved object 200, to meet the to-be-moved objects 200 of more sizes and achieve the wider application scope of the goods taking mechanism 10. In addition, compared with the goods taking mechanism 10 in the prior art, when the goods taking mechanism moves the to-be-moved objects 200 of the relatively small sizes, the distance between the to-be-moved objects 200 of the relatively small sizes may be less than the distance between the to-be-moved objects 200 of the normal sizes, which can help reduce the distance between the adjacent to-be-moved objects 200.

In addition, the first clamping plate 12 and the second clamping plate 13 are plate structures with relatively small thicknesses, and the first clamping plate 12 and the second clamping plate 13 have smaller thicknesses than the clamping arms of the existing goods taking mechanism 10. Therefore, when the to-be-moved object 200 is moved, the distance between the adjacent to-be-moved objects can also be reduced, so as to achieve more reasonable use of the storage space of the smart warehousing system. Therefore, the goods taking mechanism 10 provided in the present disclosure can clamp to-be-moved objects 200 of different sizes, which helps reduce the distance between the adjacent to-be-moved objects 200.

In a possible implementation, the first clamping plate 12 and the second clamping plate 13 may move towards reverse directions (for example, the directions indicated by the arrows shown in FIG. 5 to FIG. 7) relative to the fixed member 11. Alternatively, one of the first clamping plate 12 and the second clamping plate 13 may move relative to the fixed member 11 under the driving of the driving assembly 14, and the other keeps relatively fixed. In this embodiment, the distance between the first clamping plate 12 and the second clamping plate 13 may be adjusted, to adapt to the to-be-moved objects 200 of different sizes and reduce the distance between the adjacent to-be-moved objects 200.

Specifically, the first clamping plate 12 and the second clamping plate 13 may move horizontally relative to the fixed member 11. In this way, the first clamping plate 12 and the second clamping plate 13 may move horizontally on the fixed member 11 under the driving of the driving assembly 14, to adjust the distance between the first clamping plate 12 and the second clamping plate 13.

The first clamping plate 12 and the second clamping plate 13 may be clamped on the two opposing sides of the to-be-moved object 200, to move the to-be-moved object 200. Alternatively, the first clamping plate 12 and the second clamping plate 13 may be engaged with the to-be-moved object 200 and move the to-be-moved object 200 through dragging or in another manner. In this way, the structures of the first clamping plate 12 and the second clamping plate 13 can be more diversified.

The following further describes the goods taking mechanism 10 in this embodiment by using an example in which the first clamping plate 12 and the second clamping plate 13 are clamped on the to-be-moved object 200.

Specifically, to facilitate the movements of the first clamping plate 12 and the second clamping plate 13 relative to the fixed member 11, both the first clamping plate 12 and the second clamping plate 13 are slidably connected to the fixed member 11. In this way, under the driving of the driving assembly 14, the first clamping plate 12 and the second clamping plate 13 can move relative to the fixed member 11 more conveniently.

Referring to FIG. 4 to FIG. 6, the first clamping plate 12 may include a clamping portion 121 and an assembly portion 122. The clamping portion 121 may be mounted on the fixed member 11 through the assembly portion 122 and act on the side wall of the to-be-moved object 200. The second clamping plate 13 has the same structure as the first clamping plate 12. That is, the assembly portion 122 of the second clamping plate 13 also acts on the side wall of the to-be-moved object 200, so that the first clamping portion 121 and the second clamping portion 121 act on the two opposing sides of the to-be-moved object 200, to move and carry the to-be-moved object 200.

Specifically, the first clamping plate 12 and the second clamping plate 13 may be an integrated structure or may be a split structure. The assembly portion 122 may be detachably connected to the fixed member 11 through sliding or in another manner, which can facilitate mounting and removal of the goods taking mechanism 10 while facilitating the movements of the first clamping plate 12 and the second clamping plate 13 relative to the fixed member 11.

For example, referring to FIG. 4 to FIG. 6, the clamping portion 121 may be perpendicular to the assembly portion 122. That is, the clamping portion 121 is perpendicular to the assembly portion 122. In this way, the first clamping plate 12 and the second clamping plate 13 may be considered as an L-shaped plate structure, to achieve a higher degree of fitting with the side wall of the to-be-moved object 200 such as the goods box, thereby improving the clamping effect of the to-be-moved object 200.

Specifically, as shown in FIG. 4 and FIG. 7, the goods taking mechanism 10 may include a sliding assembly 15. Both the first clamping plate 12 and the second clamping plate 13 may be slidably connected to the fixed member 11 by the sliding assembly 15, so that the first clamping plate 12 and the second clamping plate 13 move relative to the fixed member 11.

The sliding assembly 15 may include a slide rail 151 and a sliding block 152 matching the slide rail 151. One of the slide rail 151 and the sliding block 152 may be located on the fixed member 11, and the other may be located on the surfaces of the first clamping plate 12 and the second clamping plate 13 facing the fixed member 11. In this way, it is ensured that the first clamping plate 12 and the second clamping plate 13 are slidably connected to the fixed member 11, and the setting manner of the sliding assembly 15 can be more diversified.

For example, as shown in FIG. 4 and FIG. 7, the slide rail 151 may be fixed on the fixed member 11 through threads, clamping, or in another manner, and correspondingly, the sliding blocks 152 may be fixed on the first clamping plate 12 and the second clamping plate 13. In this embodiment, the sliding blocks 152 are respectively mounted on the assembly portions 122 of the first clamping plate 12 and the second clamping plate 13 and are slidably connected to the slide rail 151 on the fixed member 11.

When the slide rail 151 is located on the fixed member 11, the slide rail 151 may be a continuous structure (as shown in FIG. 3, FIG. 4, and FIG. 7), or the slide rail 151 may be a segmented structure (a multi-segment structure). In this way, it is ensured that the first clamping plate 12 and the second clamping plate 13 are slidably connected to the fixed member 11 and can move relative to the fixed member 11, and the structure of the slide rail 151 can be more diversified.

It should be noted that, when the slide rail 151 is the segmented structure, the length of the slide rail 151 should meet a maximum sliding stoke of the first clamping plate 12 and the second clamping plate 13.

In a possible implementation, the sliding assembly 15 may be mounted adjacent to the driving assembly 14 (as shown in FIG. 3, FIG. 4, and FIG. 7). That is, the sliding assembly 15 may be mounted on the fixed member 11 close to the driving assembly 14. Alternatively, the sliding assembly 15 and the driving assembly 14 may be located on different heights of the fixed member 11. That is, there is a distance between the sliding assembly 15 and the driving assembly 14 on the fixed member 11, so that the set position of the sliding assembly 15 can be more diversified.

Specifically, referring to FIG. 3 to FIG. 7, the driving assembly 14 may include a driving motor 141 and a transmission set 142. The driving motor 141 may be separately connected to the first clamping plate 12 and the second clamping plate 13 by the transmission set 142, and the transmission set 142 is configured to cause the first clamping plate 12 and the second clamping plate 13 to be movable relative to the fixed member 11 under the driving of the driving motor 141. In this way, the first clamping plate 12 and the second clamping plate 13 may move relative to the fixed member 11, to adjust the distance between the first clamping plate 12 and the second clamping plate 13, so as to adapt to the to-be-moved objects 200 of different sizes, thereby improving the applicability of the goods taking mechanism 10 and reducing the distance between the adjacent to-be-moved objects 200.

In a possible implementation, as shown in FIG. 4 to FIG. 7, the transmission set 142 may include a gear 143 and two racks 144. The gear 143 is connected to an output shaft of the driving motor 141; the two racks 144 are respectively connected to the first clamping plate 12 and the second clamping plate 13 and mesh with the two opposing sides of the gear 143; and under the rotation of the gear 143, the two racks 144 may perform relative movement relative to the gear 143, to drive the first clamping plate 12 and the second clamping plate 13 to move close to or away from each other on the fixed member 11.

For example, when the driving motor 141 drives the gear 143 to clockwise rotate, because the two racks 144 mesh with the two sides of the gear 143, under the rotation of the gear 143, the two racks 144 move close to each other relative to the gear 143, to drive the first clamping plate 12 and the second clamping plate 13 to move close to each other on the fixed member 11, so as to reduce the distance between the first clamping plate 12 and the second clamping plate 13, thereby adapting to the to-be-moved object 200 with the relatively small size.

Oppositely, when the driving motor 141 drives the gear 143 to counterclockwise rotate, because the two racks 144 mesh with the two sides of the gear 143, under the rotation of the gear 143, the two racks 144 move away from each other relative to the gear 143, to drive the first clamping plate 12 and the second clamping plate 13 to move away from each other on the fixed member 11, so as to increase the distance between the first clamping plate 12 and the second clamping plate 13, thereby adapting to the to-be-moved object 200 with the relatively large size.

Further, the transmission set 142 may further include a reducer 145. One end of the reducer 145 is connected to the output shaft of the driving motor 141, and the other end of the reducer 145 is connected to the gear 143; and the driving motor 141 is connected to the gear 143 by the reducer 145. In this way, because the reducer 145 has a self-locking function, when the driving assembly 14 drives the first clamping plate 12 and the second clamping plate 13 to be clamped on the two opposing sides of the to-be-moved object 200 for taking goods, the to-be-moved object 200 has friction forces with the first clamping plate 12 and the second clamping plate 13, and the goods taking mechanism 10 moves the to-be-moved object 200 to the tray 21 through the friction forces.

For example, the driving motor 141 may be a servo motor. The reducer 145 may be a worm wheel and worm reducer, a planetary gear reducer, or another reduction apparatus with the self-locking function. In this embodiment, the type of the reducer 145 is not specifically limited.

It should be noted that, when the goods taking mechanism 10 needs to place the to-be-moved object 200 at a specified position of a shelving unit or on another placement platform, the goods taking mechanism 10 may directly push the to-be-moved object 200 to the specified position of the shelving unit or the another placement platform, to store the to-be-moved object 200.

Further, referring to FIG. 4, FIG. 6, and FIG. 7, the transmission set 142 may further include a fourth connection member 148. Both the first clamping plate 12 and the second clamping plate 13 may be fixedly connected to the racks 144 by the fourth connection member 148, so that when moving, the racks 144 may drive the first clamping plate 12 and the second clamping plate 13 to move relative to the fixed member 11 by using the fourth connection member 148.

Specifically, the transmission set 142 may be located on one side of the fixed member 11 facing the first clamping plate 12 and the second clamping plate 13. That is, the transmission set 142 and the first clamping plate 12 and the second clamping plate 13 may be located on the two opposing sides of the fixed member 11. In this way, when driving the first clamping plate 12 and the second clamping plate 13, the driving assembly 14 can also be prevented from interfering with the clamping of the to-be-moved object 200.

The fixed member 11 is provided with a through hole 111. The fourth connection member 148 may be mounted on the first clamping plate 12 and the second clamping plate 13 and extend out of the through hole 111 and is fixedly connected to the racks 144. In this way, the transmission set 142 and the first clamping plate 12 and the second clamping plate 13 can be located on the two opposing sides of the fixed member 11.

For example, in this embodiment, the fixed member 11 may be a plate structure. The fourth connection member 148 may be an L-shaped bent plate, to facilitate fixing of the fourth connection member 148 with the first clamping plate 12, the second clamping plate 13, and the racks 144. The through hole 111 may be a strip-shaped hole on the fixed member 11 for the fourth connection member 148 to extend out.

It should be noted that, in this embodiment, the transmission set 142 may further be another structure. The another structure of the transmission set 142 is described below with reference to the goods taking mechanism 10.

According to the goods taking mechanism provided in the present disclosure, the first clamping plate and the second clamping plate are oppositely mounted on the fixed member and are connected to the driving assembly. Under the driving of the driving assembly, the first clamping plate and the second clamping plate may move relative to the fixed member, to act on the two opposing sides of the to-be-moved object and clamp the to-be-moved objects of different sizes, so that the application scope of the goods taking mechanism is wider and the distance between the adjacent to-be-moved objects is reduced.

Embodiment 2

Figure 8:
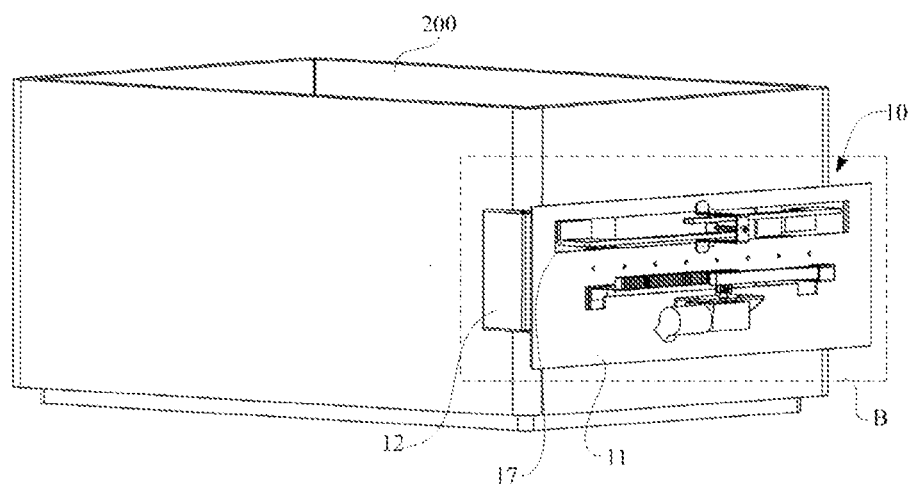
FIG. 8 is a schematic diagram of assembly of a goods taking mechanism and a to-be-moved object according to Embodiment 2 of the present disclosure.
Figure 9:
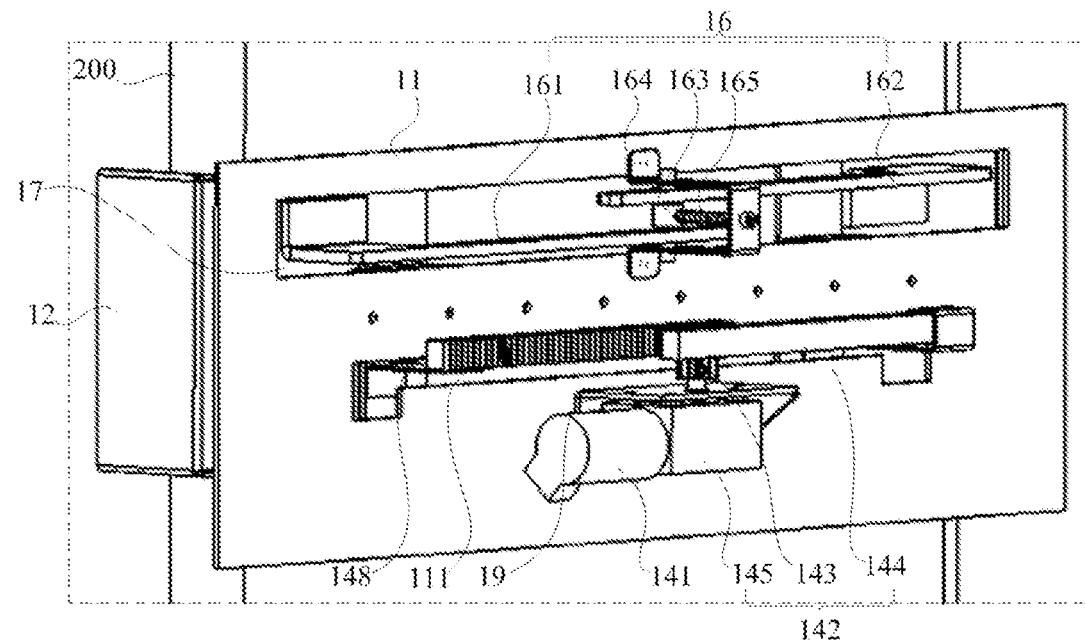
FIG. 9 is a schematic enlarged view of a part B in FIG. 8 according to Embodiment 2 of the present disclosure.
Figure 10:
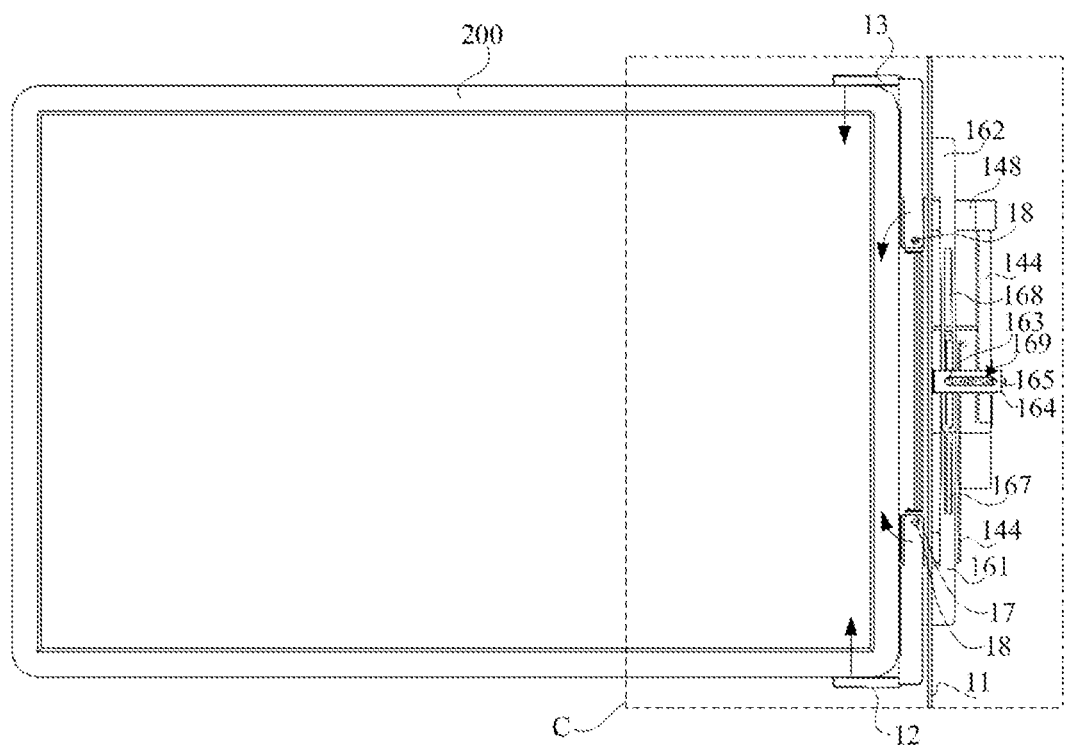
FIG. 10 is a top view of assembly of a goods taking mechanism and a to-be-moved object according to Embodiment 2 of the present disclosure.
Figure 11:
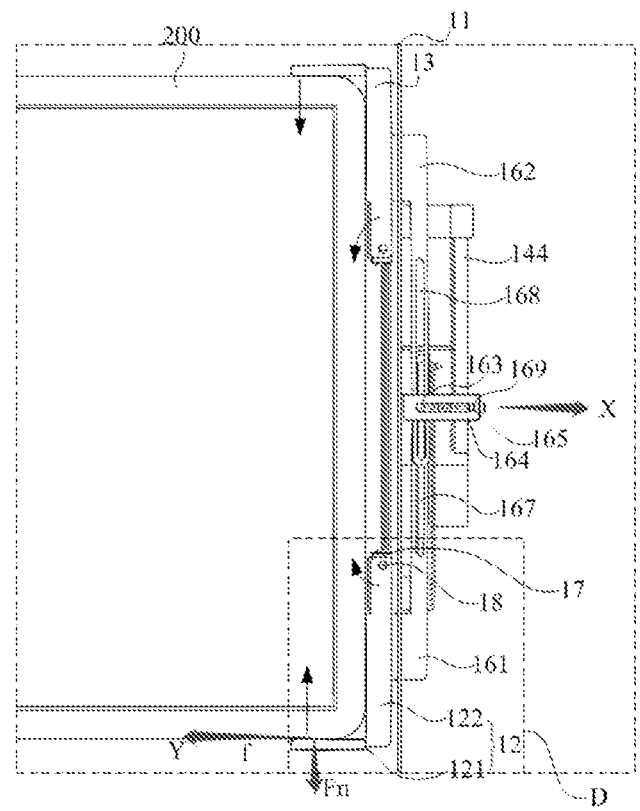
FIG. 11 is a schematic enlarged diagram of a part C in FIG. 10.
Figure 12:
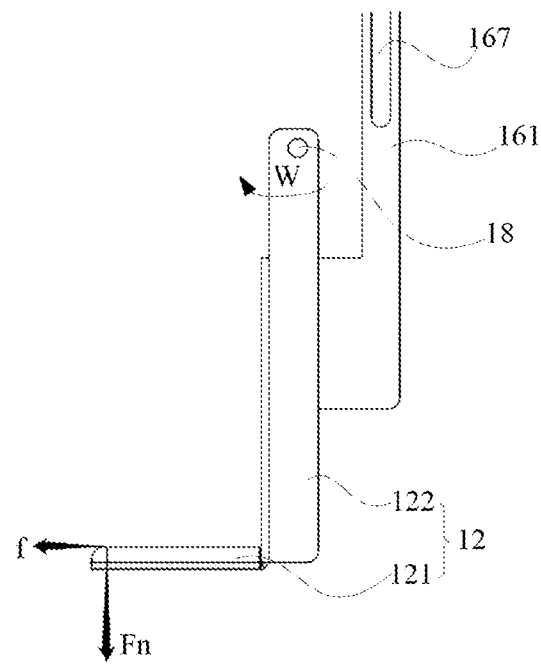
FIG. 12 is a schematic stress diagram of a first clamping plate at a part D in FIG. 11.
Figure 13:
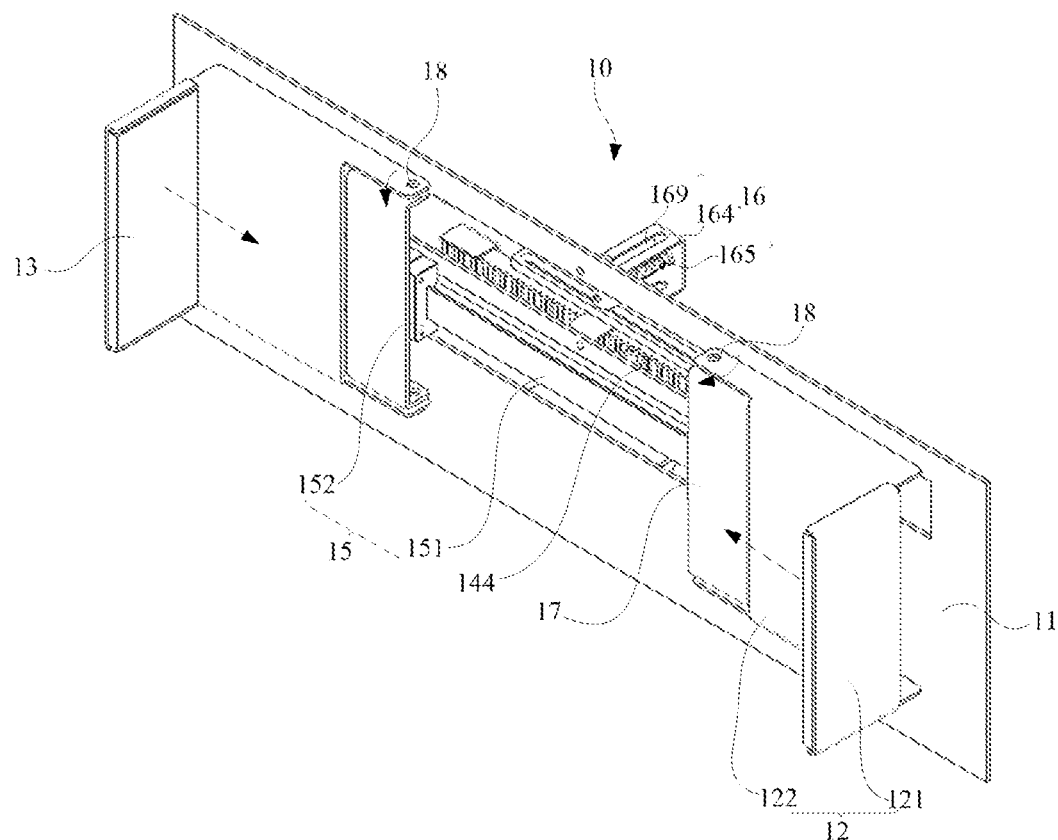
FIG. 13 is a schematic structural diagram of a goods taking mechanism according to Embodiment 2 of the present disclosure.
Figure 14:
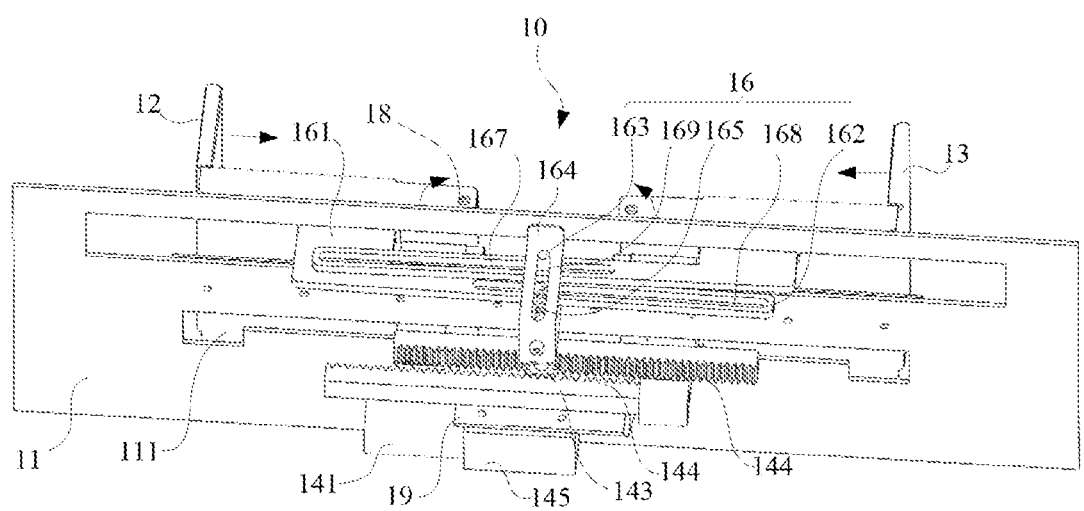
FIG. 14 is a schematic structural diagram of a goods taking mechanism from another angle according to Embodiment 2 of the present disclosure.
Figure 15:
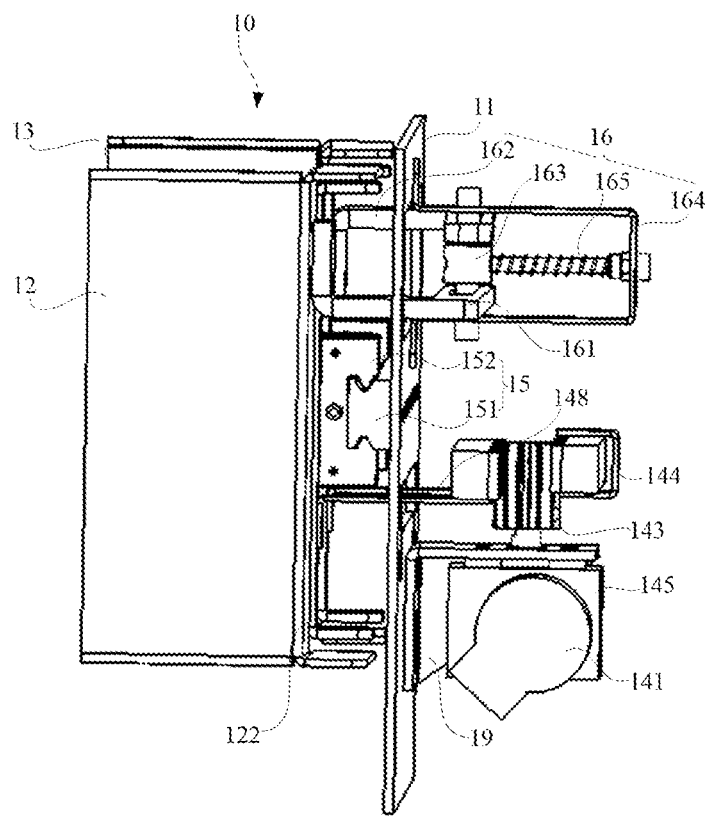
FIG. 15 is a schematic structural diagram of a goods taking mechanism from still another angle according to Embodiment 2 of the present disclosure.

FIG. 8 is a schematic diagram of assembly of a goods taking mechanism and a to-be-moved object according to Embodiment 2 of the present disclosure. FIG. 9 is a schematic enlarged view of a part B in FIG. 8 according to Embodiment 2 of the present disclosure. FIG. 10 is a top view of assembly of a goods taking mechanism and a to-be-moved object according to Embodiment 2 of the present disclosure. FIG. 11 is a schematic enlarged diagram of a part C in FIG. 10. FIG. 12 is a schematic stress diagram of a first clamping plate at a part D in FIG. 11. FIG. 13 is a schematic structural diagram of a goods taking mechanism according to Embodiment 2 of the present disclosure. FIG. 14 is a schematic structural diagram of a goods taking mechanism from another angle according to Embodiment 2 of the present disclosure. FIG. 15 is a schematic structural diagram of a goods taking mechanism from still another angle according to Embodiment 2 of the present disclosure.

As shown in FIG. 8 to FIG. 10, this embodiment provides another goods taking mechanism 10. Based on Embodiment 1, in this embodiment, the goods taking mechanism 10 may further include a first connection member 17. Both the assembly portions 122 of the first clamping plate 12 and the second clamping plate 13 are hinged to the first connection member 17 (as shown in FIG. 13), and hinge portions 18 are provided between the assembly portions 122 and the first connection member 17. Because both the assembly portions 122 of the first clamping plate 12 and the second clamping plate 13 are hinged to the first connection member 17, when the goods taking mechanism 10 moves the to-be-moved object 200 for taking goods, under the action of the friction forces between the first clamping plate 12 and the second clamping plate 13 and the to-be-moved object 200, the first clamping plate 12 and the second clamping plate 13 may further rotate around the hinge portions 18 towards the to-be-moved object 200 (rotation directions indicated by arrows in FIG. 10 to FIG. 12), to be clamped on the two opposing sides of the to-be-moved object 200, so as to clamp the to-be-moved object 200 more tightly based on Embodiment 1.

Referring to FIG. 11 and FIG. 12, when the first clamping plate 12 and the second clamping plate 13 are clamped on the two opposing sides of the to-be-moved object 200 and move towards a direction X shown in FIG. 11, the to-be-moved object 200 tends to move towards a direction Y relative to the first clamping plate 12 and the second clamping plate 13. For example, the first clamping plate 12 is analyzed. The to-be-moved object 200 has positive pressure Fn and a friction force f on the first clamping plate 12, Fn is generated by the driving motor 141 through the transmission set 142, f is generated by the movement tendency of the to-be-moved object 200, and f=μ*Fn, where μ is a friction factor between the clamping plate and the to-be-moved object 200.

As shown in FIG. 12, the first clamping plate 12 and the first connection member 17 are relatively fixed on the hinge portion 18. Therefore, under the action of f, f can drive the first clamping plate 12 to rotate in a direction w through a force arm a. Correspondingly, under the action of Fn, Fn can drive the first clamping plate 12 to rotate in a direction opposite to w through a force arm b. As described in Embodiment 1, because the goods taking mechanism 10 moves the to-be-moved object 200 to the tray 21 through the friction forces, f*a=μ*Fn*a>Feb, that is, μ*a>b. Therefore, the first clamping plate 12 finally rotates around the hinge portion in the direction w, to clamp the to-be-moved object 200 more tightly. Correspondingly, for the force of the second clamping plate 13, reference may be made to the force analysis of the first clamping plate 12.

In this embodiment, referring to FIG. 13, the assembly portion 122 may be slidably connected to the fixed member 11 by the first connection member 17. The sliding blocks 152 of the first clamping plate 12 and the second clamping plate 13 may be mounted on the first connection members 17 and are movably connected to the slide rail 151 on the fixed member 11.

Further, referring to FIG. 13 to FIG. 15, the goods taking mechanism 10 may further include a limiting assembly 16. The limiting assembly 16 is configured to limit the movements of the first clamping plate 12 and the second clamping plate 13, so that the first clamping plate 12 and the second clamping plate 13 move relative to the fixed member 11 more stably.

Specifically, referring to FIG. 14 and FIG. 15, the limiting assembly 16 may include a second connection member 161, a third connection member 162, and a sliding member 163 fixed on the fixed member 11. The second connection member 161 is provided with a first sliding groove 167 and is connected to the first clamping plate 12; and the third connection member 162 is provided with a second sliding groove 168 and is connected to the second clamping plate 13, and the sliding member 163 passes through the first sliding groove 167 and the second sliding groove 168. In this way, the first clamping plate 12 and the second clamping plate 13 are slidably connected to the fixed member 11, and based on the driving assembly 14, the horizontal movements of the first clamping plate 12 and the second clamping plate 13 relative to the fixed member 11 can be limited through the limiting assembly 16, so that the first clamping plate 12 and the second clamping plate 13 may move according to a preset track. In addition, because the sliding member 163 is fixed on the fixed member 11, the sliding member 163 may be considered as a fulcrum or a fixed point when the first clamping plate 12 and the second clamping plate 13 rotate relative to the to-be-moved object 200, so that the first clamping plate 12 and the second clamping plate 13 can rotate around the hinge portions 18 by consistent rotation angles.

It should be noted that, both a part of the second connection member 161 and a part of the third connection member 162 extend out of the fixed member 11. The first sliding groove 167 and the second sliding groove 168 are located on one side of the fixed member 11 facing the first clamping plate 12 and the second clamping plate 13.

Further, referring to FIG. 14 and FIG. 15, the limiting assembly 16 may further include a fixed frame 164 mounted on the fixed member 11. The fixed frame 164 is provided with two third sliding grooves 169 that are provided opposite to each other, the part of the second connection member 161 and the part of the third connection member 162 are mounted the fixed frame 164 through penetration, and the sliding member 163 passes through the first sliding groove 167, the second sliding groove 168, and the third sliding grooves 169 and is fixed in the fixed frame 164. In this way, the sliding member 163 may be mounted the first sliding groove 167 and the second sliding groove 168 through penetration and may also be fixed on the fixed member 11 through the fixed frame 164.

For example, the limiting assembly 16 may further include a limiting shaft 165, and the sliding member 163 is fixed in the fixed frame 164 through the limiting shaft 165, so that the sliding member 163 is fixedly mounted on the fixed member 11.

The first sliding groove 167 and the second sliding groove 168 are parallel and overlap each other, and the third sliding grooves 169 are perpendicular to the first sliding groove 167 and the second sliding groove 168. In this way, when the movements of the first clamping plate 12 and the second clamping plate 13 are limited, it may be ensured that the first clamping plate 12 and the second clamping plate 13 horizontally move relative to the fixed member 11 under the driving of the driving assembly 14.

Specifically, the second connection member 161 may be connected to the first clamping plate 12 by the first connection member 17, and the third connection member 162 is connected to the second clamping plate 13 by the first connection member 17. In this way, the first connection member 161 and the third connection member 162 may be fixed.

According to the goods taking mechanism provided in the present disclosure, when being hinged to the first connection member, the first clamping plate and the second clamping plate can clamp the to-be-moved objects of different sizes and reduce the distance between the adjacent to-be-moved objects and has a better clamping effect on the to-be-moved objects.

Embodiment 3

Figure 16:
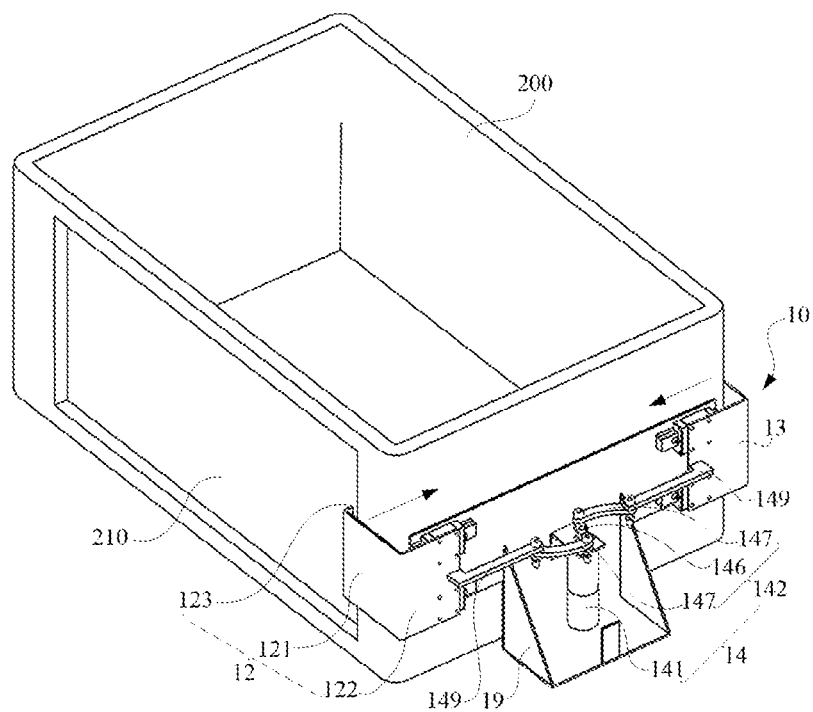
FIG. 16 is a schematic diagram of assembly of a goods taking mechanism and a to-be-moved object according to Embodiment 3 of the present disclosure.
Figure 17:
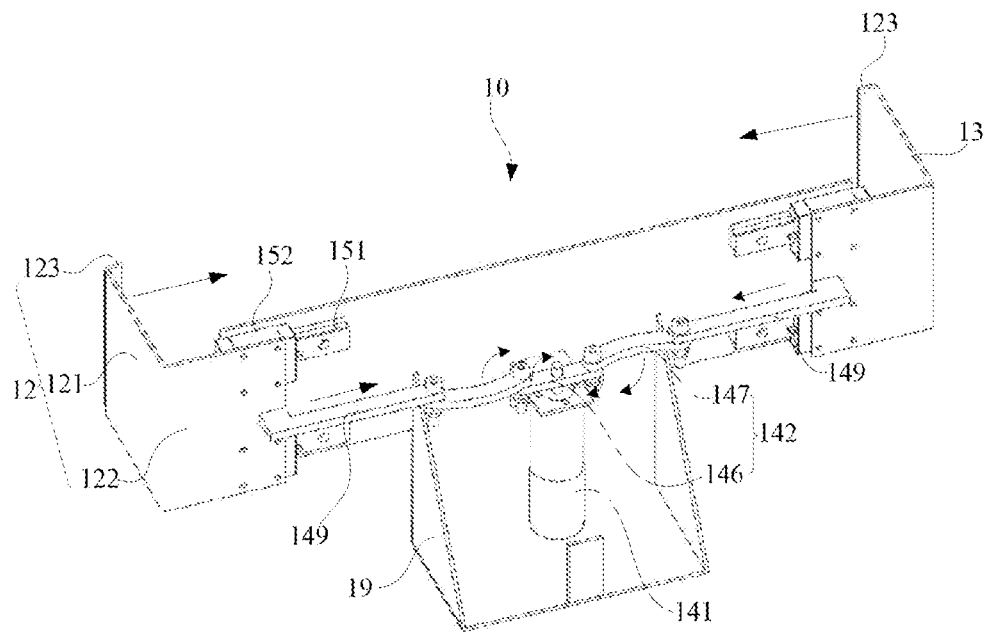
FIG. 17 is a schematic structural diagram of a goods taking mechanism according to Embodiment 3 of the present disclosure.
Figure 18:
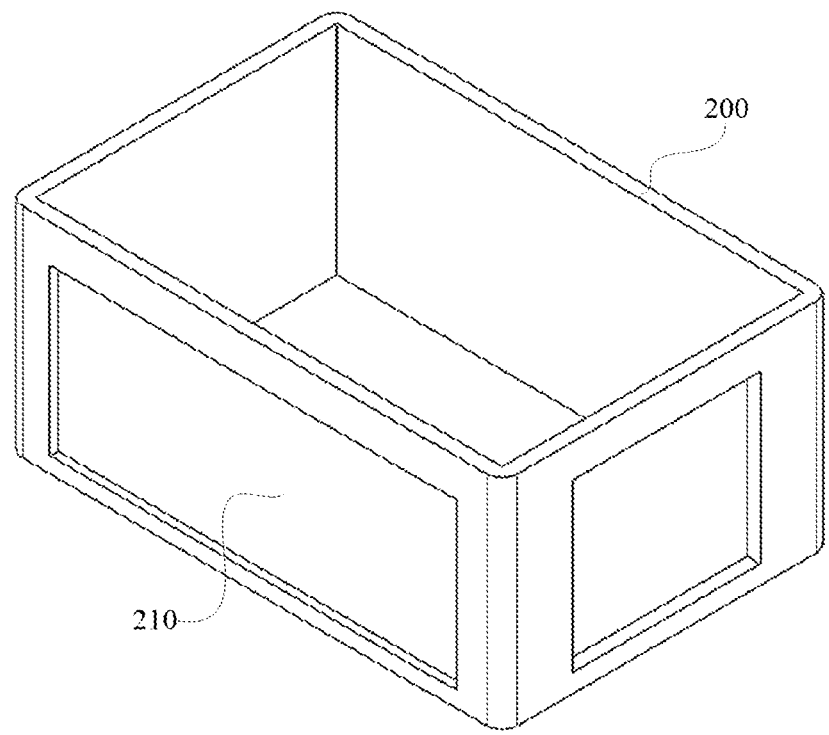
FIG. 18 is a schematic structural diagram of a to-be-moved object according to Embodiment 3 of the present disclosure.

FIG. 16 is a schematic diagram of assembly of a goods taking mechanism and a to-be-moved object according to Embodiment 3 of the present disclosure. FIG. 17 is a schematic structural diagram of a goods taking mechanism according to Embodiment 3 of the present disclosure. FIG. 18 is a schematic structural diagram of a to-be-moved object according to Embodiment 3 of the present disclosure.

Based on the foregoing embodiments, as shown in FIG. 16 and FIG. 17, this embodiment provides another goods taking mechanism 10. A difference from the goods taking mechanism 10 in the foregoing embodiments lies in that in this embodiment, the first clamping plate 12 and the second clamping plate 13 of the goods taking mechanism 10 may be engaged with the to-be-moved object 200.

Further, referring to FIG. 16 and FIG. 17, the first clamping plate 12 may further include an engagement portion 123. The engagement portion 123 may be mounted on one end of the clamping portion 121 away from the assembly portion 122 (that is, a front end of the clamping portion 121 shown in FIG. 16 and FIG. 17) and faces a surface of the to-be-moved object 200, to be engaged with the side wall of the to-be-moved object 200. Because the second clamping plate 13 has the same structure as the first clamping plate 12, the position on the second clamping plate 13 corresponding to the first clamping plate 12 is also provided with the engagement portion 123. In this way, the first clamping plate 12 and the second clamping plate 13 may be engaged with the to-be-moved object 200 through the engagement portions 123 (as shown in FIG. 16) and take the to-be-moved object 200 through dragging.

Correspondingly, referring to FIG. 18, a recess portion 210 matching the structures of the engagement portion 123 is respectively mounted on the two opposing sides of the to-be-moved object 200, so that the engagement portions 123 of the first clamping plate 12 and the second clamping plate 13 may be engaged with the recess portions 210 on the two sides of the to-be-moved object 200, to implement engagement with the to-be-moved object 200.

For example, the engagement portion 123 may be an inverted hook shown in FIG. 16 and FIG. 17. Correspondingly, the recess portion 210 may be a slot matching the structure of the inverted hook. In this way, the engagement portion 123 may be engaged with the slot, to take the to-be-moved object 200 through dragging.

In this embodiment, the slide rail 151 on the fixed member 11 may be a segmented or multi-segment structure (as shown in FIG. 17). The sliding assembly 15 and the driving assembly 14 may be located on different heights of the fixed member 11. In this way, the first clamping plate 12 and the second clamping plate 13 can be mounted on the fixed member 11 more stably.

It should be noted that, because the first clamping plate 12 and the second clamping plate 13 are engaged with the side walls of the to-be-moved object 200 through the engagement portions 123, in this embodiment, the goods taking mechanism 10 has a relatively small requirement on clamping forces of the first clamping plate 12 and the second clamping plate 13 and has a relatively high requirement on accuracy of adjustment on the distance between the first clamping plate 12 and the second clamping plate 13. Therefore, in this embodiment, the driving assembly 14 in the foregoing embodiments may be used.

In another possible implementation, referring to FIG. 16 and FIG. 17, the transmission set 142 may include a transmission member 146 and two oppositely mounted connection arms 147. The transmission member 146 is connected to the output shaft of the driving motor 141 and may rotate around the output shaft. The two connection arms 147 may be located on the two opposing sides of the transmission member 146, to respectively correspond to the first clamping plate 12 and the second clamping plate 13. A first end of each of the connection arms 147 may be connected to the transmission member 146, and there is a distance between a connection point of the connection arm 147 on the transmission member 146 and the output shaft. That is, the connection point of the connection arm 147 on the transmission member 146 and the output shaft of the driving motor 141 are eccentrically mounted. A second end of each of the connection arms 147 may be connected to the first clamping plate 12 or the second clamping plate 13. In this way, under the driving of the driving motor 141, the transmission member 146 may drive the two connection arms 147 to rotate together, to drive the first clamping plate 12 and the second clamping plate 13 to move close to or away from each other relative to the fixed member 11, so as to adjust the distance between the first clamping plate 12 and the second clamping plate 13, thereby adapting to the to-be-moved objects 200 of different sizes and reducing the distance between the adjacent to-be-moved objects 200.

For example, same as the driving manner described in Embodiment 1, as shown in FIG. 17, when the driving motor 141 drives the transmission member 146 to clockwise rotate, under the driving of the transmission member 146, the two connection arms 147 move close to each other relative to the transmission member 146, to drive the first clamping plate 12 and the second clamping plate 13 to move close to each other on the fixed member 11.

Oppositely, when the driving motor 141 drives the transmission member 146 to counterclockwise rotate, under the driving of the transmission member 146, the two connection arms 147 move away from each other relative to the transmission member 146, to drive the first clamping plate 12 and the second clamping plate 13 to move away from each other on the fixed member 11.

Specifically, the second end of each of the connection arms 147 may be connected to the first clamping plate 12 or the second clamping plate 13 by a fixed strip 149. One end of the fixed strip 149 may be hinged to the second end of the connection arm 147, a second end of the fixed strip 149 may be fixedly connected to the first clamping plate 12 or the second clamping plate 13, so that the first clamping plate 12 and the second clamping plate 13 may be driven to move relative to the fixed member 11 through the connection arms 147.

For example, the connection arms 147 may be arc-shaped arms or connection structures in another shape.

To fix the driving motor 141, the driving motor 141 may further be fixed on the fixed member 11 through a support 19. In this embodiment, the structure of the support 19 is not specifically limited.

According to the goods taking mechanism provided in the present disclosure, through mounting of the engagement portions, the first clamping plate and the second clamping plate can clamp to-be-moved objects of different sizes and reduce the distance between the adjacent to-be-moved objects and make the structure of the goods taking mechanism more diversified.

In descriptions of the present disclosure, it should be understood that direction or position relationships indicated by terms such as "center", "length", "width", "thickness", "above", "below", "front", "back", "left", "right", "vertical", "horizontal", "top", "bottom", "inner", and "outer" are direction or position relationships based on the accompanying drawings, and are used only for conveniently describing the present disclosure and simplifying descriptions, instead of indicating or suggesting that a represented apparatus or element needs to have a particular direction or is constructed and operated in a particular direction, and therefore shall not be understood as limiting the present disclosure.

In the descriptions of the present disclosure, it should be understood that the terms "comprise", "contain" and any other variants used in the specification mean to cover the non-exclusive inclusion, for example, a process, method, system, product, or device that comprises a list of steps or units is not necessarily limited to those steps or units, but may comprise other steps or units not expressly listed or inherent to such a process, method, system, product, or device.

Unless explicitly specified or limited otherwise, the terms "mounted", "connected", "connection", and "fixed" should be understood broadly, for example, which may be fixed connections, detachable connections or integral connections; a direct connection, an indirect connection through an intermediate, or internal communication between two elements or an interaction relationship between two elements. A person of ordinary skill in the art can understand specific meanings of the foregoing terms in the present invention according to a specific situation. In addition, the terms "first" and "second" are used for descriptive purposes only and are not to be construed as indicating or implying relative importance or implicitly indicating the number of technical features indicated.

Finally, it should be noted that the foregoing embodiments are merely used for describing the technical solutions of the disclosure, but are not intended to limit the disclosure. Although the disclosure is described in detail with reference to the foregoing embodiments, a person of ordinary skill in the art is to understand that, modifications may still be made to the technical solutions in the foregoing embodiments, or equivalent replacements may be made to some or all of the technical features; and these modifications or replacements will not cause the essence of corresponding technical solutions to depart from the scope of the technical solutions in the embodiments of the disclosure.

What is claimed is:

1. A goods taking mechanism, comprising:
   a fixed member,
   a first clamping plate,
   a second clamping plate,
   a driving assembly, wherein the first clamping plate and the second clamping plate are oppositely mounted on the fixed member and are connected to the driving assembly, and the first clamping plate and the second clamping plate are movable relative to the fixed member under the action of the driving assembly, to act on two opposing sides of a to-be-moved object; and
   a limiting assembly, wherein the limiting assembly is configured to limit movement of the first clamping plate and the second clamping plate;
   wherein the limiting assembly comprises a second connection member, a third connection member, and a sliding member fixed on the fixed member; the second connection member is provided with a first sliding groove and is connected to the first clamping plate; and the third connection member is provided with a second sliding groove and is connected to the second clamping plate, and the sliding member passes through the first sliding groove and the second sliding groove;
   wherein the limiting assembly further comprises a fixed frame mounted on the fixed member, the fixed frame is provided with two third sliding grooves that are mounted opposite to each other, a part of the second connection member and a part of the third connection member are mounted in the fixed frame through penetration, and the sliding member passes through the first sliding groove, the second sliding groove, and the third sliding grooves and is fixed in the fixed frame.

2. The goods taking mechanism according to claim 1, wherein the first clamping plate comprises a clamping portion and an assembly portion, the clamping portion is mounted on the fixed member through the assembly portion and acts on a side wall of the to-be-moved object, and a structure of the second clamping plate is the same as a structure of the first clamping plate.

3. The goods taking mechanism according to claim 2, further comprising a first connection member, wherein both the assembly portions of the first clamping plate and the second clamping plate are hinged to the first connecting member, hinge portions are provided between the assembly portions and the first connecting member, and both the first clamping plate and the second clamping plate are rotatable around the hinge portions towards the to-be-moved object, to be clamped on the two opposing sides of the to-be-moved object.

4. The goods taking mechanism according to claim 2, wherein the first clamping plate further comprises an engagement portion, and the engagement portion is mounted on one end of the clamping portion away from the assembly portion and faces a surface of the to-be-moved object, to be engaged with the side wall of the to-be-moved object.

5. The goods taking mechanism according to claim 1, wherein the limiting assembly further comprises a limiting shaft, and the sliding member is fixed in the fixed frame through the limiting shaft.

6. The goods taking mechanism according to claim 1, further comprising a sliding assembly, wherein both the first clamping plate and the second clamping plate are slidably connected to the fixed member by the sliding assembly.

7. The goods taking mechanism according to claim 6, wherein the sliding assembly comprises a slide rail and a sliding block matching the slide rail, one of the slide rail and the sliding block is located on the fixed member, and the other of the slide rail and the sliding block is located on surfaces of the first clamping plate and the second clamping plate facing the fixed member.

8. The goods taking mechanism according to claim 1, wherein the driving assembly comprises a driving motor and a transmission set, the driving motor is separately connected to the first clamping plate and the second clamping plate by the transmission set, and the transmission set is configured to cause the first clamping plate and the second clamping plate to be movable relative to the fixed member under the driving of the driving motor.

9. A carrying device, comprising a body and a goods taking mechanism;
   wherein the goods taking mechanism comprises: a fixed member, a first clamping plate, a second clamping plate, and a driving assembly, wherein the first clamping plate and the second clamping plate are oppositely mounted on the fixed member and are connected to the driving assembly, and the first clamping plate and the second clamping plate are movable relative to the fixed member under the action of the driving assembly, to act on two opposing sides of a to-be-moved object;
   wherein the goods taking mechanism further comprises a limiting assembly, and the limiting assembly is configured to limit movement of the first clamping plate and the second clamping plate;
   wherein the limiting assembly comprises a second connection member, a third connection member, and a sliding member fixed on the fixed member; the second connection member is provided with a first sliding groove and is connected to the first clamping plate; and the third connection member is provided with a second sliding groove and is connected to the second clamping plate, and the sliding member passes through the first sliding groove and the second sliding groove;
   wherein the limiting assembly further comprises a fixed frame mounted on the fixed member, the fixed frame is provided with two third sliding grooves that are mounted opposite to each other, a part of the second connection member and a part of the third connection member are mounted in the fixed frame through penetration, and the sliding member passes through the first sliding groove, the second sliding groove, and the third sliding grooves and is fixed in the fixed frame.

10. The carrying device according to claim 9, wherein the first clamping plate comprises a clamping portion and an assembly portion, the clamping portion is mounted on the fixed member through the assembly portion and acts on a side wall of the to-be-moved object, and a structure of the second clamping plate is the same as a structure of the first clamping plate.

11. The carrying device according to claim 10, wherein the goods taking mechanism further comprises a first connection member, wherein both the assembly portions of the first clamping plate and the second clamping plate are hinged to the first connecting member, hinge portions are provided between the assembly portions and the first connecting member, and both the first clamping plate and the second clamping plate are rotatable around the hinge portions towards the to-be-moved object, to be clamped on the two opposing sides of the to-be-moved object.

12. The carrying device according to claim 9, wherein the limiting assembly further comprises a limiting shaft, and the sliding member is fixed in the fixed frame through the limiting shaft.

13. The carrying device according to claim 9, wherein the goods taking mechanism further comprises a sliding assembly, wherein both the first clamping plate and the second clamping plate are slidably connected to the fixed member by the sliding assembly.

14. The carrying device according to claim 9, wherein the driving assembly comprises a driving motor and a transmission set, the driving motor is separately connected to the first clamping plate and the second clamping plate by the transmission set, and the transmission set is configured to cause the first clamping plate and the second clamping plate to be movable relative to the fixed member under the driving of the driving motor.

* * * * *